Nov. 1, 1955  J. NAGY  2,722,243
SAW TABLE EXTENSION DEVICE
Filed May 11, 1954
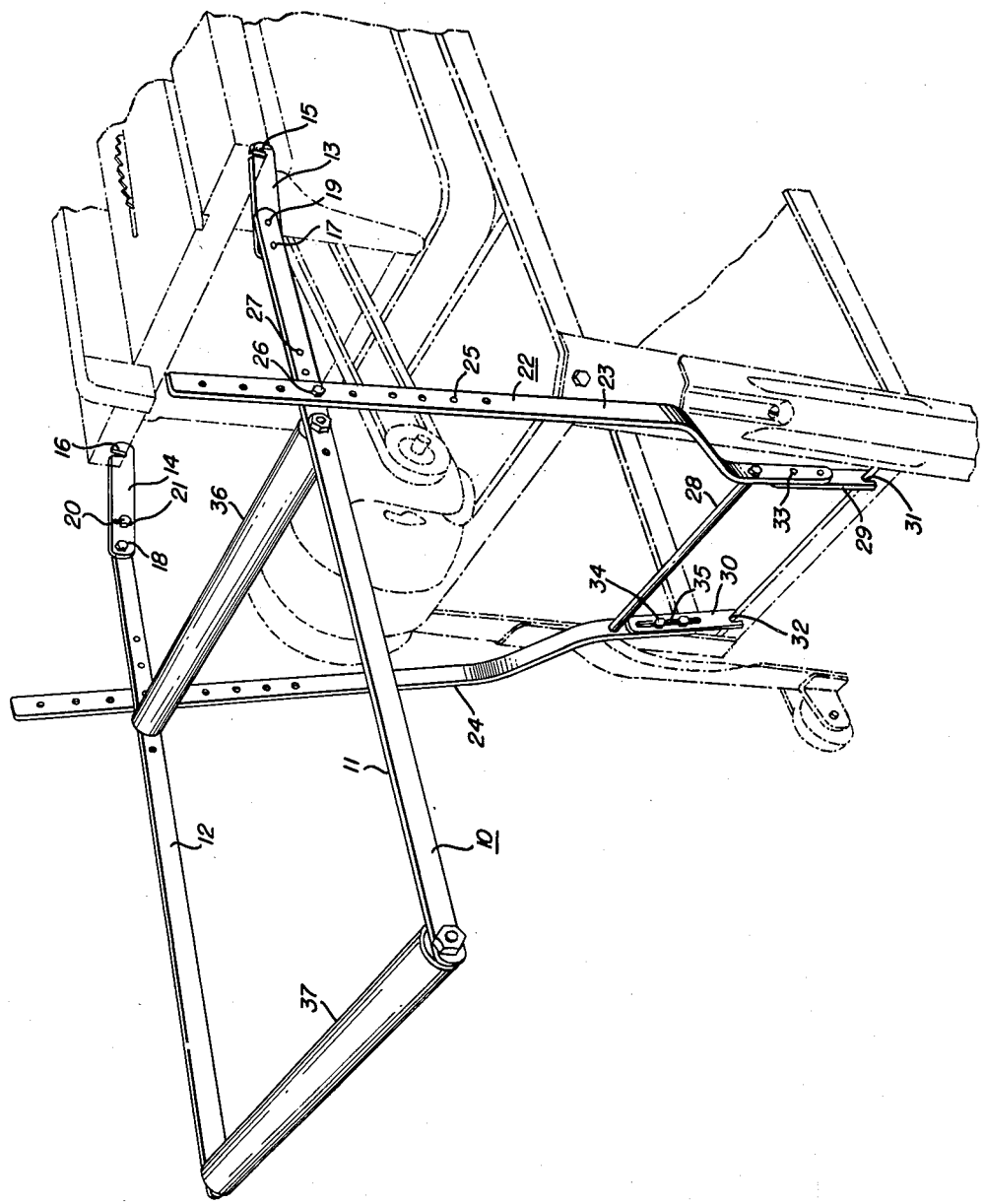
INVENTOR.
John Nagy
BY Ray S Pyle
atty

United States Patent Office 2,722,243
Patented Nov. 1, 1955

2,722,243

SAW TABLE EXTENSION DEVICE

John Nagy, Lakewood, Ohio

Application May 11, 1954, Serial No. 428,899

6 Claims. (Cl. 143—132)

This invention relates to new and useful improvements in attachment for saw tables and more particularly to the provision of a foldable extension for the table by means of which relatively long pieces of lumber may be supported while being fed to the saw and/or traveling therefrom.

An object of this invention is to provide a foldable saw table extension which may be easily and quickly attached in position to the end or one edge of the saw table without necessitating any changes or alterations in the construction thereof.

A further object of this invention is to provide a foldable saw table extension which may be folded into a compact form for convenient handling and storing the same when not in use.

Another object of this invention is to provide such extension to lock into operating position by gravity and natural forces with no lock devices or gripping clamps required.

A still further object of this invention is to provide a device of this character of simple and practical construction which is efficient and reliable in use, relatively inexpensive to manufacture, and otherwise well adapted for the purpose for which the same is intended.

Other objects and a fuller understanding of the invention may be had by referring to the following description and claims, taken in conjunction with the accompanying drawing, in which:

The single figure of the drawing is a perspective view showing the saw table extension in position attached to a table-type power saw.

Prior art devices intended for the same or similar purpose are exemplified by the United States Patent No. 2,555,217 issued to Raymond E. Young, May 29, 1951. This patent and the prior art cited therein will clearly demonstrate the prior art concept and still serve to emphasize the inventive features of the present invention.

In the drawing, a table saw and a conventional metal bench are illustrated in phantom outline and the device of this invention is superimposed thereon in full lines.

The illustrated embodiment has an extension bed 10 composed of frame bars 11 and 12 laterally spaced and supporting two rollers 36 and 37. One end of the bed 10 is engaged with the saw and the other end extends in cantilever form from the saw.

In order to provide for vertical adjustment of the rollers 36 and 37 to place the rollers exactly on an extension plane of the top of the saw table, extension pieces 13 and 14 are provided at the end of bed 10 which engages the saw. Extension piece 13 is provided with a notch 15 on the end thereof and extension piece 14 with a similar notch 16. Pivot bolts 17 and 18 hold the extension pieces longitudinally fixed but swingable with respect to the bars 11 and 12. Lock bolts 19 and 20 are adapted to frictionally grip the extension pieces and hold them in a selected relative pivoted position. A slot 21 in extension piece 14 illustrates the provision for adjustable positioning of the pieces 13 and 14 prior to permanent locking in that selected relative position by tightening of the lock bolts 19 and 20.

It should be understood that the provision of extension pieces is an auxiliary feature which makes the invention more universally adaptable and may be dispensed with if the extension table is specifically tailored for one particular saw or model of saws. The more practical approach, however, is to provide the adjustable extension pieces in order to make one model of the invention serve many different makes and models of saw devices.

An outstanding feature of the present invention is the holding of the extension table in proper operative position wholly by gravity and natural forces and thereby eliminating the need for clamps or permanent bolt connections. Thus, the table can be engaged and disengaged in a fraction of a minute. In this respect, a leg device 22 is provided to engage and support the extension bed on the side of the center of gravity of the bed 10 closest to the saw device. The bed 10 will tend to pivot about the leg device 22 and force the end engaged with the saw device into a snug engagement. The application of pressure on the bed 10, such as by placing a board thereon in operative position, will cause the extension bed to engage the saw even more firmly.

The illustrated leg device 22 is composed of leg members 23 and 24 having a series of holes 25 therein for holding a bolt 26 to engage into companion holes 27 in the frame bars 11 and 12. The preferable construction provides threads in either of the holes 25 or 27 and the use of a bolt 26 having a shoulder thereon which will permit the bolt to be tightly seated in the threaded hole without tightly clamping the leg member and the frame bar together. Thus, when the saw extension is removed from the illustrated operative position, the bar 37 may be hung over a hook on the wall and the entire device will assume a longitudinally extended position and lie flat against the wall for easy storage.

The leg members 23 and 24 are preferably braced by a brace 28. Furthermore, it is believed advisable to provide extension foot members 29 and 30 for height adjustment of the leg device. The extension foot members 29 and 30 are slotted, as illustrated by the slot 35 in the foot 30, to provide for such adjustment. Bolts 33 and 34 are then provided to clampingly engage the extension foot members in any selected degree of adjustment.

Although it is entirely possible to use pads on the end of the extension foot members and set the leg device on the floor supporting the saw table, it is preferable, when using the type of table illustrated in the drawing, to provide notches 31 and 32 in the extension foot members in order to permit the leg device 22 to engage the brace of the saw table and permit the entire assembly of saw machine and extension table to be moved as a unit, and also eliminating the possibility of misadjustment because of uneven floors.

As previously explained, the illustrated embodiment of the invention has incorporated every conceivable adjustment in order to make the device universally adaptable. The plurality of holes 25 in the leg members permits a first height adjustment of the bed 10. The excess part of the leg members 22 which extends above the bars 11 and 12 may be removed if desired after the device has been properly adjusted to a particular saw machine. It is recognized that the rollers 36 and 37 cannot be exactly adjusted into the plane of the working surface of the saw by adjustment between the holes 25 and, accordingly, the further adjustment of the foot members 29 and 30 is available to provide an even, close adjustment once the merest adjustment has been made by means of holes 25. Thereafter, final and perfect adjustment of the rollers 36 and 37 is made by the pivotal adjustment of the extension pieces 13 and 14 as previously explained. By the provision of the various adjustments, perfect longitudinal alignment of the three members, 36, 37, and the working surface of the saw is readily accomplished. Once these adjustments have been made on a particular saw device, they need never again be readjusted unless accidentally forced out of adjustment.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What I claim is:

1. A table extension for a table having a downwardly extending lip edge, comprising, an extension bed member having a first end and a second end, said bed member having a center of gravity between said first and second ends, means to detachably engage said first end to the table, said means being upwardly opening notches at said first end to hook under the lip of the table, and leg means engaging and supporting said bed member between said first end and said center of gravity.

2. A table extension for a table having a downwardly extending lip edge, comprising, an extension bed member having a first end and a second end, said bed member having a center of gravity between said first and second ends, means to detachably engage said first end to the table, said means being upwardly opening notches at said first end to hook under the lip of the table, leg means, and pivotal attachment means interconnecting said leg means and bed member between said first end and center of gravity.

3. In claim 2, the provision of said leg means having a foot portion adapted to hook over a table brace, and being adjustable in height.

4. A table extension for a table having a downwardly extending lip edge, comprising, an extension bed member having a first end and a second end, said bed member having a center of gravity between said first and second ends, means to detachably engage said first end to the table, said means to detachably engage said first end to the table being extension pieces notched at one end to hook under the lip of the table and attached to the extension bed member by a joint means providing vertical adjustment, and leg means engaging and supporting said bed member between said first end and center of gravity, whereby the joint means may be adjusted within limits to position the second end of the bed member exactly aligned with the plane of the table.

5. A table extension for a table having a downwardly extending lip edge, comprising, an extension bed member having a first end and a second end, said bed member having a center of gravity between said first and second ends, means to detachably engage said first end to the table, said means to detachably engage said first end to the table being extension pieces notched at one end to hook under the lip of the table and attached to the extension bed member by a joint means providing vertical adjustment, leg means, and pivotal attachment means interconnecting said leg means and bed member between said first end and center of gravity, whereby the joint may be adjusted within limits to positon the second end of the bed member exactly aligned with the plane of the table.

6. A table extension for a table having a downwardly extending lip edge, comprising, an extension bed member having a first end and a second end, said bed member having a center of gravity between said first and second ends, means to detachably engage said first end to the table, said means to detachably engage said first end to the table being extension pieces notched at one end to hook under the lip of the table and attached to the extension bed member by a joint means providing vertical adjustment, leg means having a foot portion adapted to hook over a table brace, said leg means being adjustable in height, and pivotal attachment means interconnecting said leg means and bed member between said first end and center of gravity, whereby the joint may be adjusted within limits to position the second end of the bed member exactly aligned with the plane of the table.

References Cited in the file of this patent

UNITED STATES PATENTS

| | | |
|---|---|---|
| 103,347 | Lepp | May 24, 1870 |
| 1,474,323 | Geibel | Nov. 13, 1923 |
| 1,498,319 | Dexter | June 17, 1924 |
| 1,582,346 | Oster | Apr. 27, 1926 |
| 1,792,955 | Willis | Feb. 17, 1931 |
| 2,555,217 | Young | May 29, 1951 |